United States Patent [19]
Sheng

[11] Patent Number: 6,003,555
[45] Date of Patent: Dec. 21, 1999

[54] STRUCTURE OF A PRESSURE REGULATOR

[76] Inventor: Chih-Sheng Sheng, No. 100, Tzu Chiang W. Road, Kweishan Hsiang, Tao-Yuan Hsien, Taiwan

[21] Appl. No.: 09/182,483

[22] Filed: Oct. 30, 1998

[51] Int. Cl.[6] .................................................. F16L 55/04
[52] U.S. Cl. ............................................. 138/31; 138/30
[58] Field of Search ........................................ 138/30, 31

[56] References Cited

U.S. PATENT DOCUMENTS

| | | | |
|---|---|---|---|
| 3,336,948 | 8/1967 | Lucien | 138/31 |
| 3,714,964 | 2/1973 | Livingston | 138/31 |
| 4,997,009 | 3/1991 | Niikura et al. | 138/31 |
| 5,036,879 | 8/1991 | Ponci | 138/30 |

*Primary Examiner*—Andres Kashnikow
*Assistant Examiner*—Davis Hwu

*Attorney, Agent, or Firm*—Rosenberg, Klein & Lee

[57] ABSTRACT

An improved structure of a pressure regulator including a body and an adjusting device. The adjusting device includes a retractable bent in shape from a metal material and provided on an upper side of the body. The secondary pressure in the interior of an enclosed space defined between the retractable tube and upper and lower plates is utilized to act in a stable and uniform manner on the upper plate to thereby change the length of the retractable tube and bring a valve plug to elevate so as to control high pressure gas flowing from a primary pressure chamber to a secondary pressure chamber. By means of the elasticity of the retractable tube that coordinates with the pressure of the gas, the output of secondary pressure can be stable and precise without being affected by the pressure different caused by change in the internal pressure of the container (steel cylinder), thus having the advantages of extended service life and enhanced safety.

3 Claims, 7 Drawing Sheets

STRUCTURE OF A PRESSURE REGULATOR

BACKGROUND OF THE INVENTION (a) Field of the Invention

The present invention relates to an improved structure of a pressure regulator, and more particularly to a pressure retractable tube construction, in which the elasticity of the coordination between the elasticity of the retractable tube and the pressure of a high pressure gas is utilized to achieve stable and pressure secondary pressure output without being affected by the primary pressure. Besides, leakage proof is ensured.

(b) Description of the Prior Art

Some gases, such as oxygen, acetylene, nitrogen, argon, etc., have to be containerized under high pressure so that they can be utilizable by industries. But before the gas can be output for use, the pressure of the gas must be adjusted to a suitable value by using a pressure regulator so as to ensure normal and safe operation of instrument pipelines, apparatus, or relevant equipment. And the major function of the pressure regulator is to ensure the stability of the output pressure.

FIGS. 1–4 show a conventional pressure regulator. A body 1 has an upper cover 11 screwably provided thereon and an interior divided into a primary pressure chamber P1 and a secondary pressure chamber P2. The primary pressure chamber P1 communicates with an intake duct 12 and a primary pressure gauge 13. The secondary pressure chamber P2 communicates with a discharge duct 14, a secondary pressure gauge 13, and a relief valve 16. A valve 17 having a small spring fitted at a bottom end thereof is disposed between the primary and secondary pressure chambers P1, P2 to control opening and closing of the path. Furthermore, the center of the upper cover 11 forms a recess 111, and a lower end thereof forms a flange 112 that, together with the body 1, keeps a plastic film 18 sandwiched therebetween so as to link-up with the valve 17 and partition the secondary pressure chamber P2 and the recess 111. The upper cover 11 is further provided with a threaded through hole at a top end thereof for mounting an adjusting screw 113 that extends into the recess 111. The recess 11 internally accommodates a large spring 19 that has an upper end provided with a packing plate 191 adapted to be urged against by the adjusting screw 113, and a lower end urging against a metal packing plate 181 provided at the center of the plastic film 18.

However, since the adjustment of the pressure in the secondary pressure chamber P2 is through the adjusting screw 113 that is disposed in a knob 114 and adjusts the position of the large spring 19 so that it exerts pressure a curved position of the plastic film 18 to thereby control the opening of the valve 17 to form a path and control the high pressure gas flowing from the primary pressure chamber P1 to the secondary pressure chamber P2. When the gas pressure of the secondary pressure chamber P2 is greater than the pressure exerted by the large spring 19 above the plastic film 18, the plastic film 18 will curve in deformation as shown in FIG. 4. At this time, the valve 17 is subjected to the elasticity of the small spring 171 at the bottom end and elevates to close the valve port 172 of the primary pressure chamber P1. When the discharge duct 14 releases pressure, the pressure in the secondary pressure chamber P2 drops, and the plastic film 18 will be subjected to the elasticity of the large spring 19 to resume its original curved shape, as shown in FIG. 3. Additionally, the metal packing plate 181 at the center of the plastic film 18 urges against a top rod 173 of the valve 17 to cause it to drop therewith, thereby opening the valve port 172, so that the gas in the primary pressure chamber P1 flows into the secondary pressure chamber P2. The pressure of the secondary pressure chamber P2 is continuously adjusted in the above manner to achieve the required pressure output.

Therefore, the plastic film 18 is constantly changing its curved shape. And because it has extendibility, after use thereof for a period of time, the plastic film 18 will be worn out. If the container is used to hold a corrosive gas, gas leakage may occur due to wearing out of the plastic film 18. In addition, the thickness of the plastic film 18 is not very uniform so that deformation often occurs at the relatively thin portions, and the force bearing area will likewise be affected.

Furthermore, since the output of the secondary pressure is achieved by using the adjusting screw 113 of the knob 114, the large spring 19, and the metal packing plate 181 to control the plastic film 18, the plastic film 18 cannot be positively controlled at a determined position. In addition, the high pressure gas in the steel cylinder will change with use. For instance, the pressure of the high pressure gas in the steel cylinder when full is about 150 kg/cm$^2$, but there may remain only about 10 kg/cm$^2$. Such a considerable pressure difference will cause the output pressure from the primary pressure chamber P1 to be unstable. As a result, the valve 17 located in the primary pressure chamber P1 and the small spring 171 at its bottom portion are likely to be affected by the pressure difference. Besides, since the small spring 171 controlling the elevation of the valve 17 has low elasticity, the influence on the valve 17 due to pressure difference is relatively greater, hence affecting the precision of the valve in gas flow control. Besides, the plastic film 18 that is flexible will also vibrate and deform in shape due to negative pressure and unstable pressure.

SUMMARY OF THE INVENTION

A primary object of the present invention is to provide an improved structure of a pressure regulator, in which an adjusting device includes a retractable tube bent from a metal material and locked on an upper side of a body. By means of the retraction and extension of the metallic retractable tube at different pressure values, and by utilizing an upper plate to link-up with a valve plug located at a valve port in a primary pressure chamber to elevate therewith, gas flow can be controlled. The present invention provides a regulator structure that utilizes positive pressure and pressure balance to overcome the drawback caused by pressure different in change of internal pressure of the container (steel cylinder) and to achieve stable and precise secondary pressure output.

Another object of the present invention is to provide an improved structure of a pressure regulator that can be applied on both fixed pressure type regulators and pressure adjustable type regulators.

A further object of the present invention is to provide an improved structure of a pressure regulator that has long service life and is leakage-proof to ensure safety.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
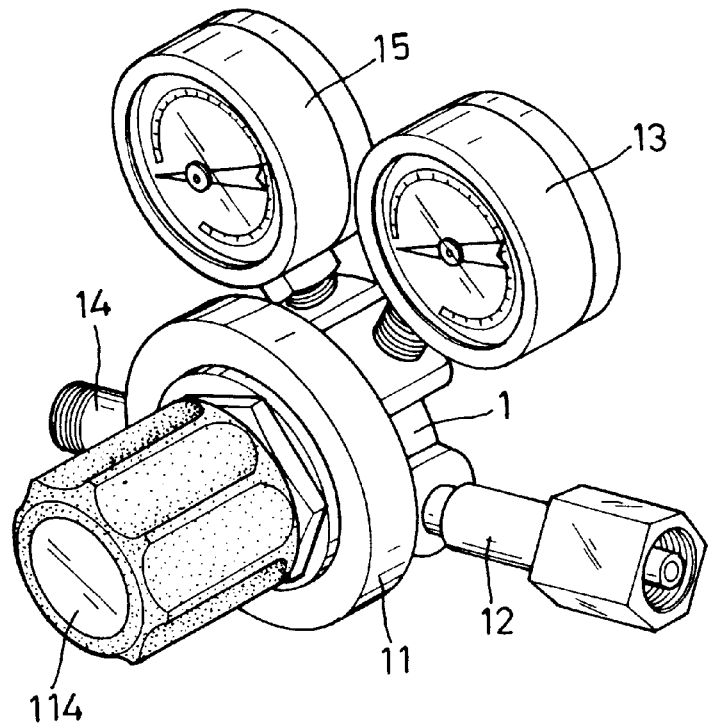
FIG. 1 is a schematic view of a conventional pressure regulator.
Figure 2:
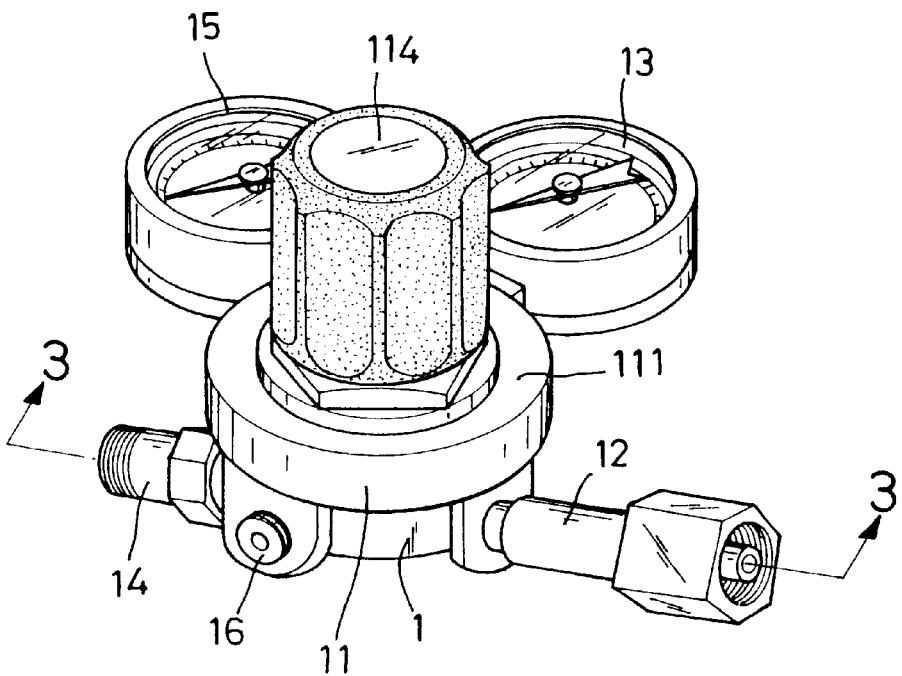
FIG. 2 is another schematic view of the conventional pressure regulator.
Figure 3:
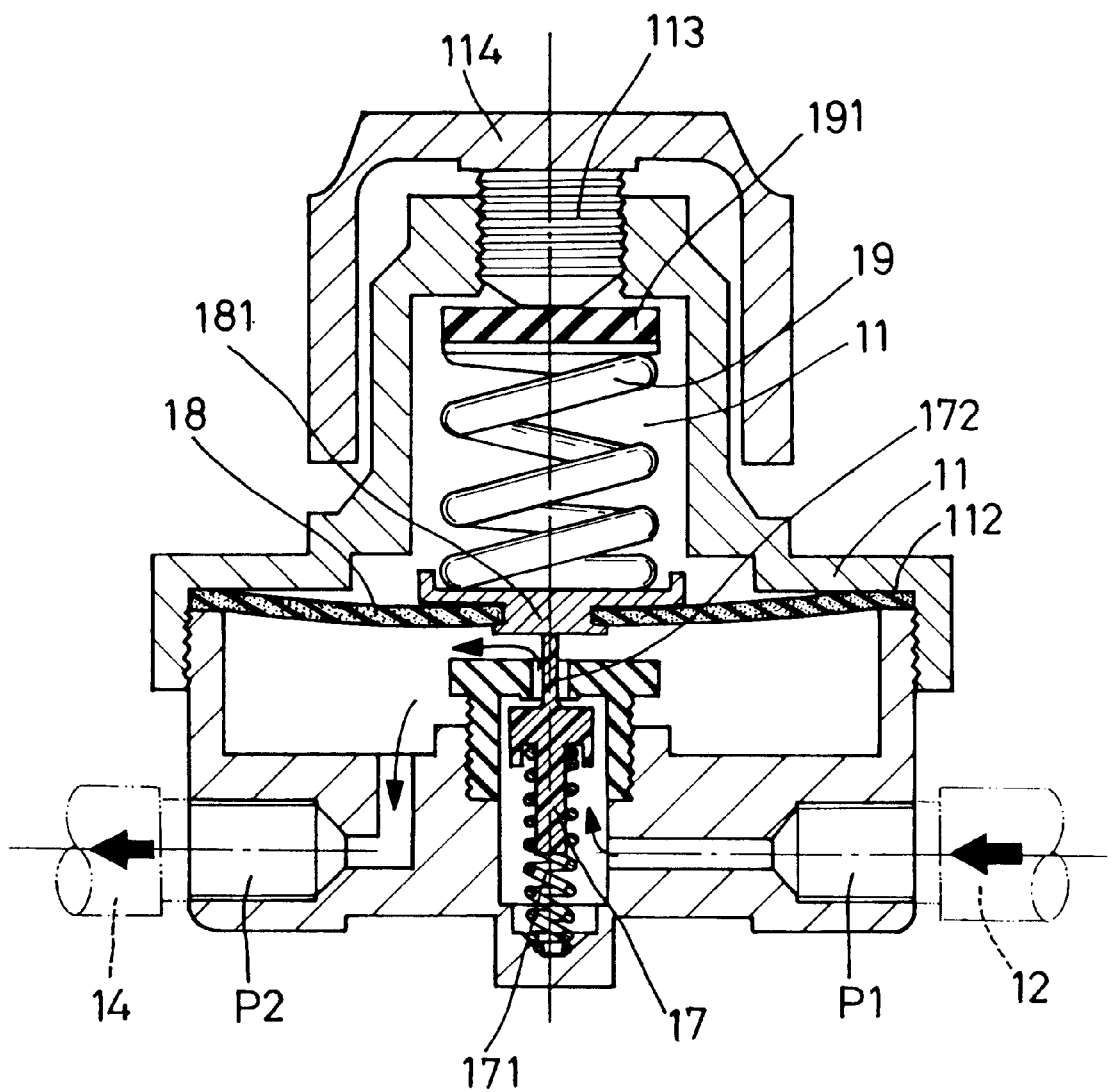
FIG. 3 is a longitudinal section of the conventional pressure regulator, showing the valve in an opened state.
Figure 4:
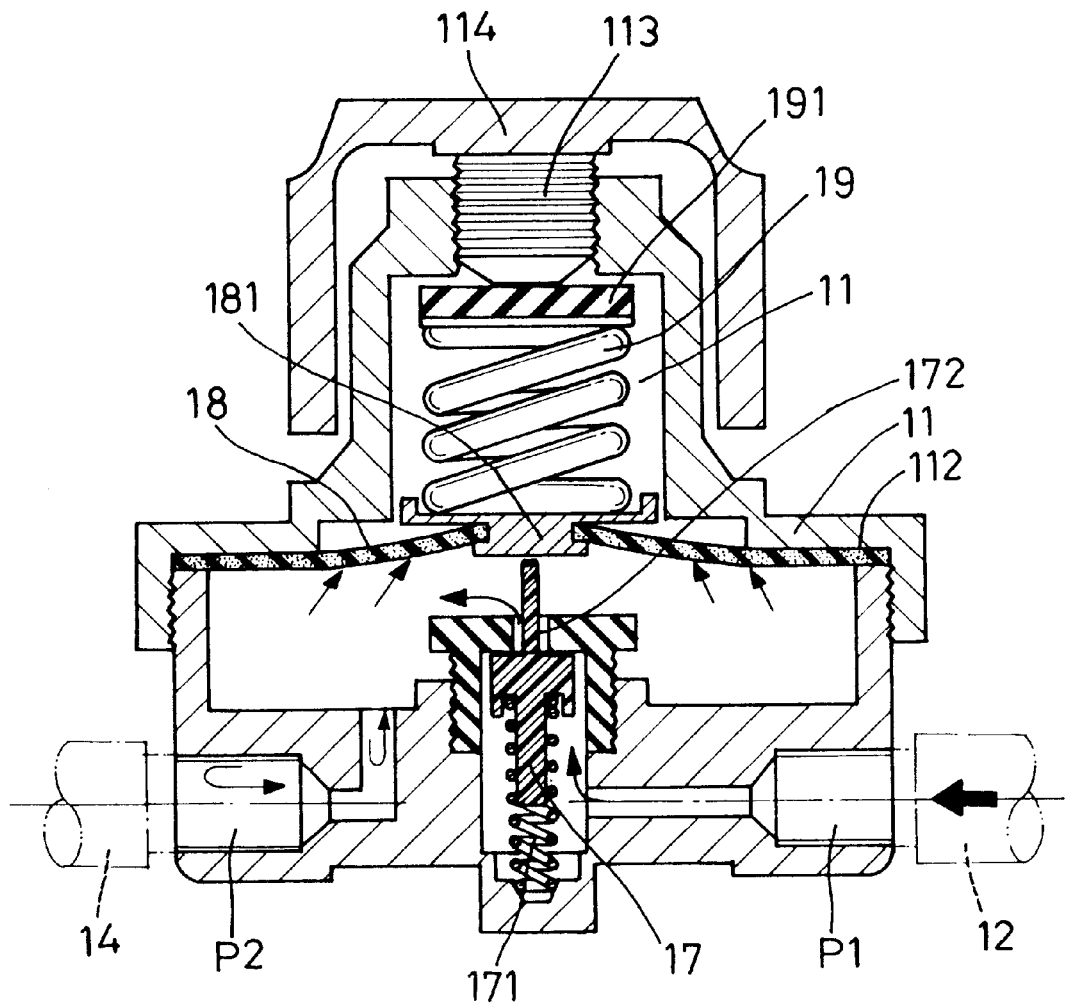
FIG. 4 is a longitudinal section of the conventional pressure regulator, showing the valve in a closed state.
Figure 5:
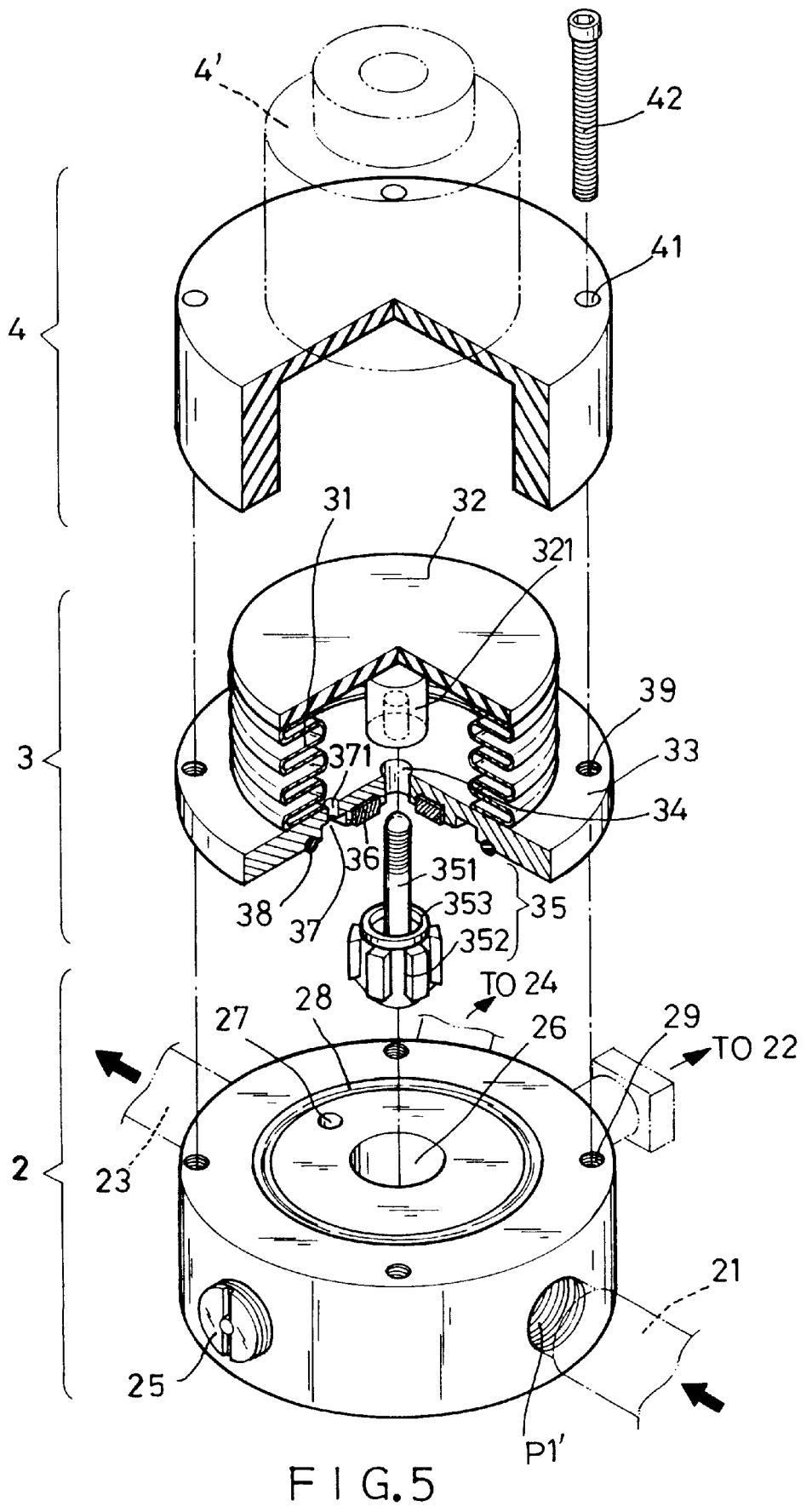
FIG. 5 is an exploded view of a preferred embodiment of the present invention.
Figure 6:
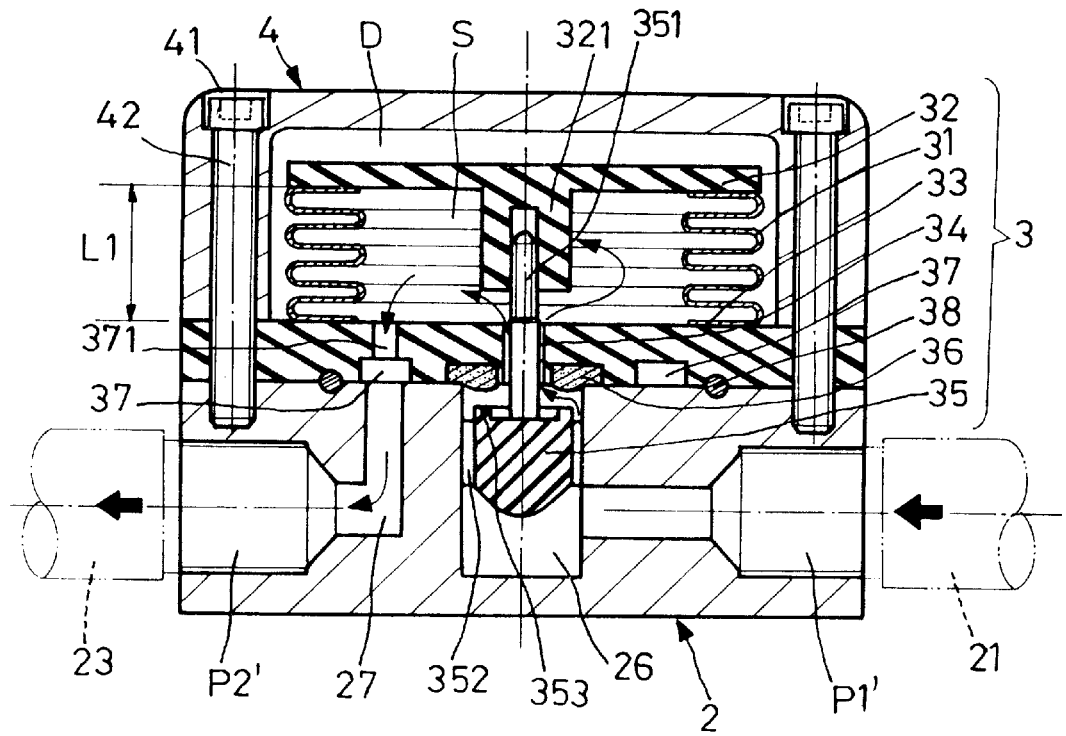
FIG. 6 is a longitudinal section of the preferred embodiment of the present invention, illustrating opening of the valve.

With reference to FIGS. 5 and 6, the first preferred embodiment of the present invention comprises a body 2, an adjusting device 3, and an upper cover 4.

The body 1 has a hollow interior that is partitioned into a primary pressure chamber P1' and a secondary pressure chamber P2'. The primary pressure chamber P1' communicates with an intake duct 21 and a primary pressure gauge 22. The secondary pressure chamber P2' communicates with a discharge duct 23, a secondary pressure gauge 24 and a relief valve 25. The primary and secondary pressure chambers are provided with through holes 26, 27 respectively going to a top face of the body 2 to constitute a communication path. The top face of the body 2 is further provided with an O-shaped annular mounting groove 28 and a plurality of screw holes 29.

The adjusting device 3 includes a retractable tube 31 bent from metal disposed between upper and lower plates 32, 33. A bottom face of the upper plate 32 is provided with a projection 321; the lower plate 33 is provided with a valve port 34 opposite to the projection 321 and the through hole 26 of the primary pressure chamber P1'. A mounting rod 351 of a valve plug 35 extends into and is screwably provided in the projection 321, with the body of the valve plug 35 located inside the through hole 26. Additionally, the outer periphery of the body of the valve plug 35 is provided with a plurality of longitudinal groove-like air vents 352, and a top edge of the body of the valve plug 35 is provided with an annular rib 353. The bottom face of the lower plate 33 is provided with an elastic element 36 facing the annular rib 353, as well as an annular groove 37, an O-ring 38, and a plurality of screw holes 39 corresponding to the through hole 27 of the secondary pressure chamber P2', the annular mounting groove 28, and the screw holes 29. The annular groove 37 is provided with a through hole 371 to the top face of the lower plate 33.

The upper cover 4 is provided with a plurality of screw holes 41 corresponding to the screw holes 29, 39 of the body 2 and the adjusting device 3 for receiving a plurality of bolts 42 that assemble the body 2, the adjusting device 3, and the upper cover 4 together, with a suitable clearance D left between the bottom edge of the top face of the upper cover 4 and the top face of the upper plate 32.

The above-described embodiment is a fixed pressure type regulator. In other words, according to the requirements of particular industries, the threaded end of the mounting rod 351 of the valve plug 35 inside the screw hole of the projection 321 is micro-adjusted in factory so as to control the distance the valve plug 35 urges against the valve port 34 when it elevates, thus achieving the object of securing the secondary pressure chamber P2'. A fixed type pressure regulator such as this meets special requirements of industries, such as those industries that require the two output pressures to be about 5 kg/cm$^2$ without making any adjustment during the process.

Figure 10:
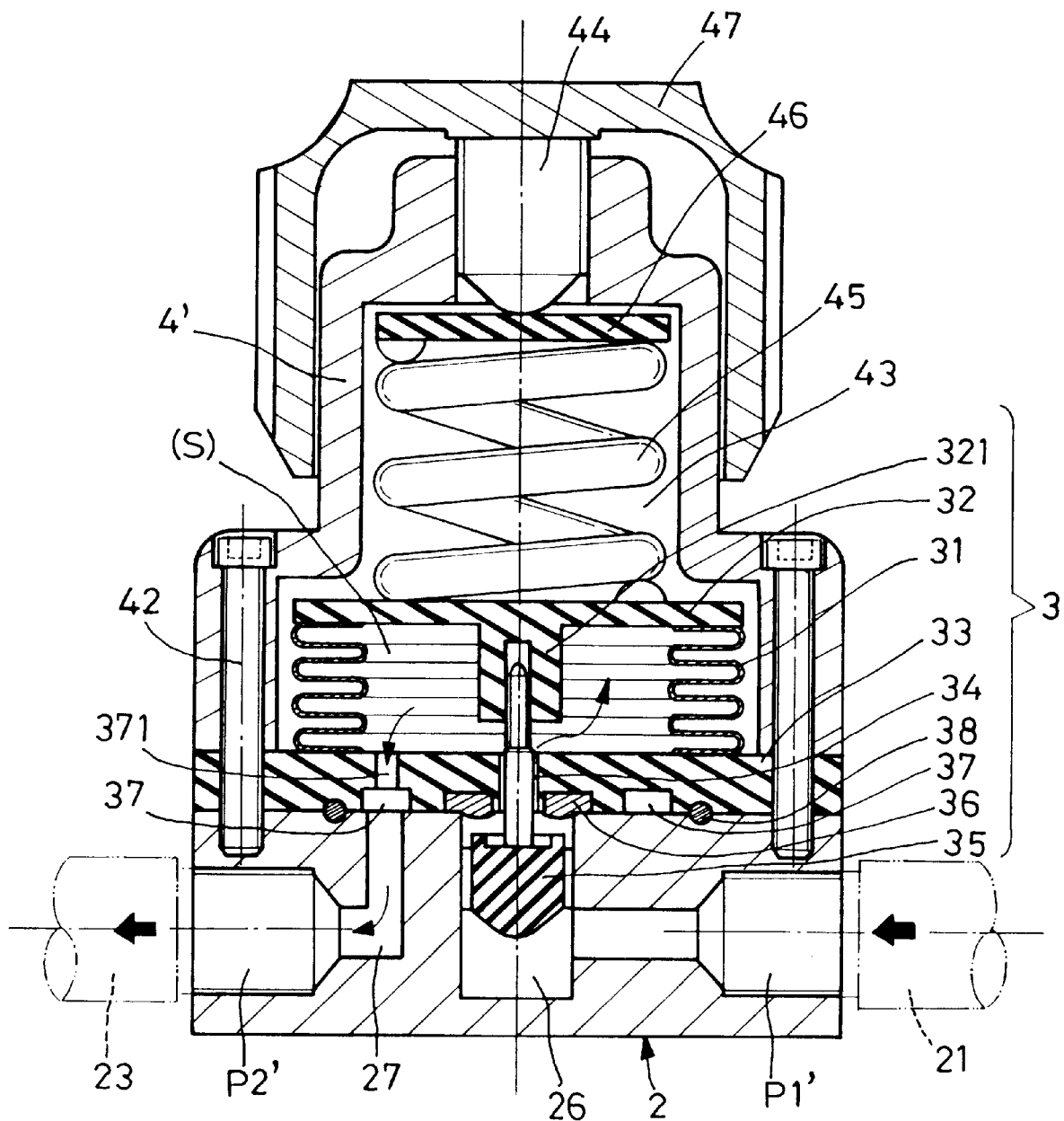
FIG. 10 is a longitudinal section of another preferred embodiment of the present invention.

Certainly, most pressure regulators are provided with adjustment means to adjust pressure outputs to allow adjustment of different pressures in response to different work processes. FIG. 10 shows another embodiment of the present invention allowing for micro-adjustment. The center of the upper cover 4' is configured to be protrudent and a recess 43 is formed in the interior. The top end of the upper cover 4' is provided with a threaded through hole for mounting an adjusting screw 44 that extends into the recess 43. The recess 43 accommodated therein a spring 45 having a lower end thereof urging against the top face of the upper plate 32. An upper end of the spring 45 is provided with a packing plate 46 adapted to be urged against by the adjusting screw 44. Certainly, the adjusting screw 44 may be rotatable by a knob 47.

Furthermore, the metallic retractable tube 31 may, according to the requirements of industries, be of stainless steel, phosphor copper, or other equivalent corrosion-resistant metal materials. As for the pitch of bends and the number of wavy layers, they depend on the elasticity of the retractable tube 31.

Figure 7:
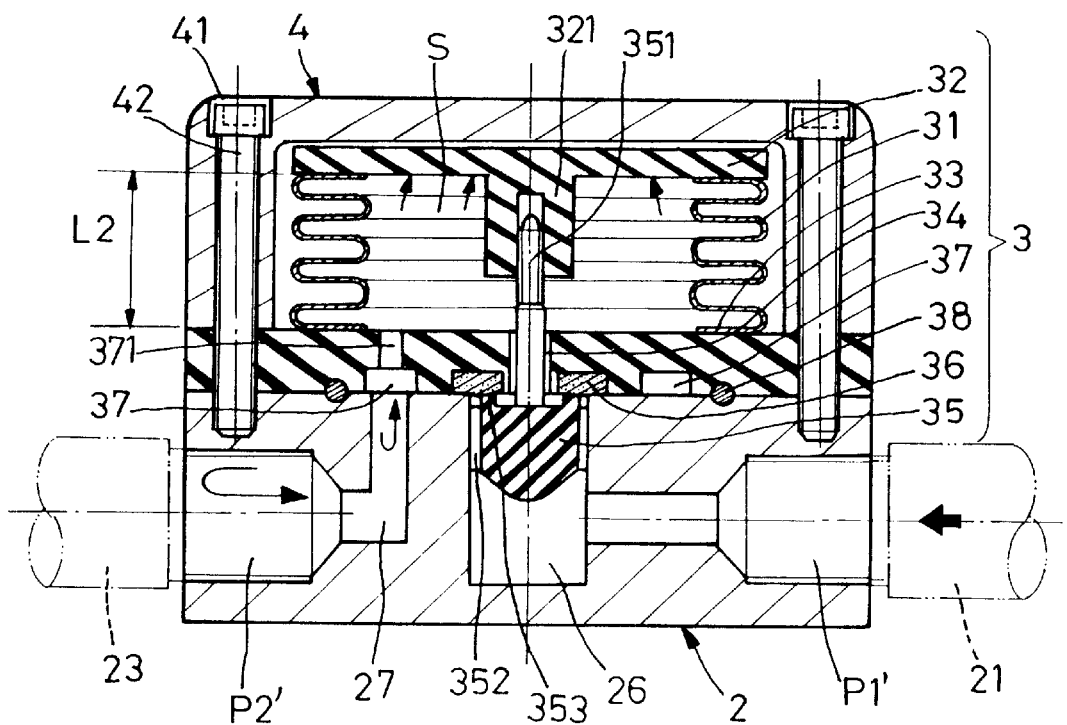
FIG. 7 is a longitudinal section of the preferred embodiment of the present invention, illustrating the closing of the valve.
Figure 8:
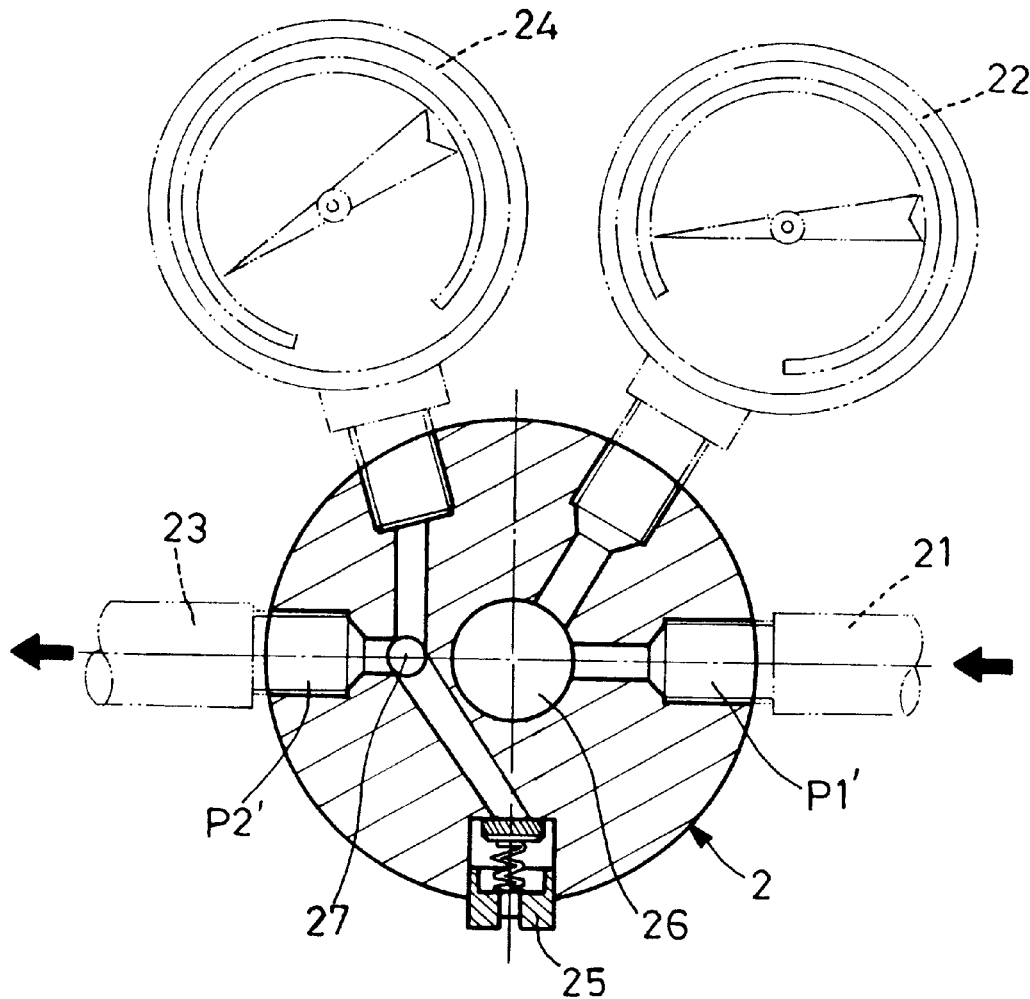
FIG. 8 is a transverse section of the preferred embodiment of the present invention.
Figure 9:
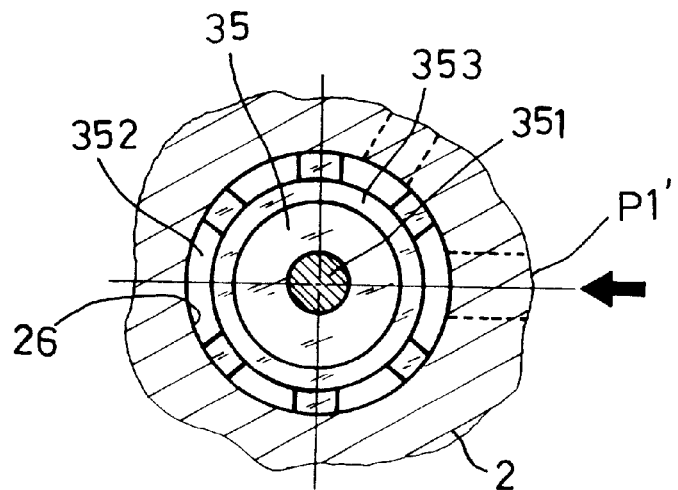
FIG. 9 is a top view of the preferred embodiment of the present invention in which the valve plug is located in a through hole.

With reference to FIGS. 6–8, in use, gas flows in through the air discharge duct 31 so that the pressure in the secondary pressure chamber P2' drops. At this time, the retracted tube 31 is in a retracted state, causing the upper plate 32 to bring the valve plug 35 to drop simultaneously by linking-up movement. On the other hand, high pressure gas enters from the intake duct 21 into the primary pressure chamber P1'. The primary pressure can be measured by the primary pressure gauge 22. And the high pressure gas of the primary pressure chamber P1' passes firstly through the air vents 352 on the outer periphery of the body of the valve plug 35 and then through the valve port hole 34 of the lower plate 33 of the adjusting device 3 into an enclosed space S defined by the retractable tube 31 and upper and lower plates 32, 33. Next the gas enters from the through hole 371 of the lower plate 33 and the annular groove 37, and the through hole 27 of the secondary pressure chamber P2' of the body 2 into the secondary pressure chamber P2' and then out through the discharge duct 23 for use. The pressure of the secondary pressure chamber P2' can be measured by using the secondary pressure gauge 24.

The characterizing features and effects of the present invention are shown in FIGS. 6 and 7. Referring to FIG. 6, when the high pressure gas of the primary pressure chamber P1' enters the space S defined by the retractable tube 31 and upper and lower plates 32, 33, and the air discharge duct 23 generates a return pressure, the secondary pressure inside the space S pushes the upper plate 32 to thereby change the length of the retractable tube 31, forcing the retractable tube 31 to extend from a first length L1 in FIG. 6 to a second length L2 in FIG. 7. And when the retractable tube 31 lengthens, the upper plate 32 brings the valve plug 35 to elevate therewith. When the retractable tube 31 reaches a determined extended length L2, then the annular rib 353 of the valve plug 35 will urge against the elastic element 36 on the bottom face of the lower plate 33, isolating the valve port hole 34 leading to the enclosed space S, thereby maintaining the secondary pressure at a suitable value. It should be particularly mentioned that during retraction and extension of the retractable tube 31, the upper plate 32 is fixed and does not deform, unlike conventional plastic films 18 the shape of which will deform. Besides, the bent wavy shape of the tube body also retracts and extends in a stable and uniform manner, without uneven distribution of force. Furthermore, the capacity of the enclosed space S is much larger with respect to the space of the through hole 26 of the primary pressure chamber P1'. Therefore, the change in length of the retractable tube 31 is achieved by means of the secondary pressure in the enclosed space S, not by the primary pressure that acts on the valve plug 35 to push the upper plate 32. Therefore, the change in the pressure difference of the primary pressure chamber P1' will not affect the extension of the retractable tube 31. Hence, the regulation of pressure according to the present invention is very precise. Compared to the prior art that utilizes negative pressure regulating method in which a plastic film urges downwardly against a valve port valve, and a small spring is used to elastically press against the valve port valve, thus being affected by the primary pressure difference, the present invention that employs the coordination between the elasticity of the retractable tube 31 and the pressure of the gas to achieve a positive pressure to adjust the length of the retractable tube 31 and to thereby bring the valve plug 35 to elevate without being affected by the change in primary pressure has the improved effect of stable output of secondary pressure.

Furthermore, since the retractable tube 31 is bent from corrosion-resistant metal material, its elastic characteristic will not be affected by the chemical characteristic of the gas or long-term use, that may affect the precision of the regulation of secondary pressure. Besides, even if used with corrosive gases, the retractable tube 31 will not be corroded to cause gas leakage that will cause danger.

In addition, since the adjusting device 3, including the metallic retractable tube 31 and upper and lower plates 32, 33, is retractable and elastic itself, the valve plug 35 may be utilized for micro-adjustment in factory to set a fixed secondary pressure output value. Therefore, the present invention can be adapted directly for use on fixed type air pressure regulators required by particular industries. Certainly, as shown in FIG. 10, the present invention may further include a spring 45 and an adjusting screw 44 to allow free adjustment of the output value of the secondary pressure. For example, the retractable tube 31 of the adjusting device 3 is utilized to set a secondary pressure at a certain value, i.e., a determined length of extension, and the upper plate 32 is utilized to link-up with the valve plug 35 to just close the valve port 34. In this way, the output value of the secondary pressure can be maintained at the set value. And when it is necessary to adjust the secondary pressure up or down, the knob 47 can be turned so that the adjusting screw 44 alters the elastic pressure exerted by the spring 45 on the upper side of the upper plate 32. Hence, the secondary pressure originally in the enclosed space S has to overcome the pressure exerted by the spring 45, apart from the elasticity of the retractable tube 31, when urging against the upper plate 32, thus obtaining an adjusted output pressure value. Therefore, the greater the elastic pressure exerted by the spring 45 on the retractable tube 31, the greater the secondary pressure output value, so on and so forth.

As regards the detailed structure of the body 2, as well as the primary pressure gauge 22, the secondary pressure gauge 24, and the relief valve 25, as it belongs to the prior art and not a feature of the present invention, it will not be described in detail herein.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved structure of a pressure regulator, comprising:
    a body having a hollow interior that is partitioned into a primary pressure chamber and a secondary pressure chamber, said primary pressure chamber communicating with an intake duct, said secondary pressure chamber communicating with a discharge duct and a relief valve, said primary and secondary pressure chambers each having a through hole leading to a top face of said body to constitute a communication path; and
    an adjusting device locked to an upper side of said body by utilizing an upper cover, wherein
        said top face of said body on the periphery of said through hole is provided with an O-ring mounting groove and a plurality of screw holes;
        said adjusting device includes a retractable tube bent in shape from a metal material, and upper and lower plates, said retractable tube being disposed between said upper and lower plates, said upper plate having a bottom face provided with a projection, said lower plate being provided with a valve port opposite to said projection and to said through hole of said primary pressure chamber, a mounting rod of a valve plug extending into and being screwably provided in said projection with a main body of said valve plug located in the interior of said through hole, the outer periphery of said main body of said valve plug being provided with a plurality of groove-like air vents, a top edge of said main body being provided with an annular rib, the bottom face of said lower plate being provided with an elastic element opposite to said annular rib, and an annular groove, an O-ring, and a plurality of screw holes corresponding respectively to said through hole of said secondary pressure chamber, said O-ring mounting groove and said screw holes of said body, said annular groove being provided with a through hole leading to a top face of said lower plate; and
        said upper cover is provided with a plurality of screw holes corresponding to said screw holes of said body and said adjusting device whereby bolts can be used to assemble said body, said adjusting device, and said upper cover together, with a suitable clearance defined between a lower edge of a top face of said upper cover and a top face of said upper plate.

2. An improved structure of a pressure regulator as defined in claim 1, wherein the center of said upper cover is configured to be protrudent, and the interior thereof forming a recess, a top end of said upper cover being provided with a threaded through hole adapted for mounting an adjusting screw that extends into said recess, said recess further accommodating a spring that has a lower end urging against the top face of said upper plate and a lower end provided with a packing plate adapted to be pressed against by said adjusting screw.

3. An improved structure of a pressure regulator as defined in claim 1, wherein said primary and secondary pressure chambers are respectively connected to primary and secondary pressure gauges.

* * * * *